United States Patent

[11] 3,596,695

| [72] | Inventor | Aldo Stevenazzi<br>Rho, Italy |
|---|---|---|
| [21] | Appl. No. | 861,928 |
| [22] | Filed | Sept. 29, 1969 |
| [45] | Patented | Aug. 3, 1971 |
| [73] | Assignee | Alfa Romeo S.p.A.<br>Milan, Italy |
| [32] | Priority | Oct. 8, 1968 |
| [33] | | Italy |
| [31] | | 10,139 B/68 |

[54] PROTECTIVE HOOD FOR IGNITION DISTRIBUTORS OF MOTOR VEHICLES
4 Claims, 4 Drawing Figs.

[52] U.S. Cl. ........................................ 150/52 K, 220/4 E
[51] Int. Cl. ........................................ B65d 11/18
[50] Field of Search............................. 220/4 E, 4 R; 150/52 R, 52 K

[56] References Cited
UNITED STATES PATENTS

| 147,332 | 2/1874 | Knight | 220/55 AN UX |
| 3,092,277 | 6/1963 | Brim | 220/4 E X |
| 3,269,710 | 8/1966 | Ramus | 150/52 K X |
| 3,455,409 | 7/1969 | Clark | 150/52 K X |
| 3,500,994 | 3/1970 | Gillespie | 220/4 E X |

*Primary Examiner*—Donald F. Norton
*Attorney*—Holman and Stern

ABSTRACT: A protective casing for ignition distributors of internal combustion engines is disclosed, comprising two half-shells adapted to encompass the outer surface of the ignition distributor, a resilient cap to be slipped onto the adjoining upper ends of the half-shells, and at least two clips for holding the two half-shells together.

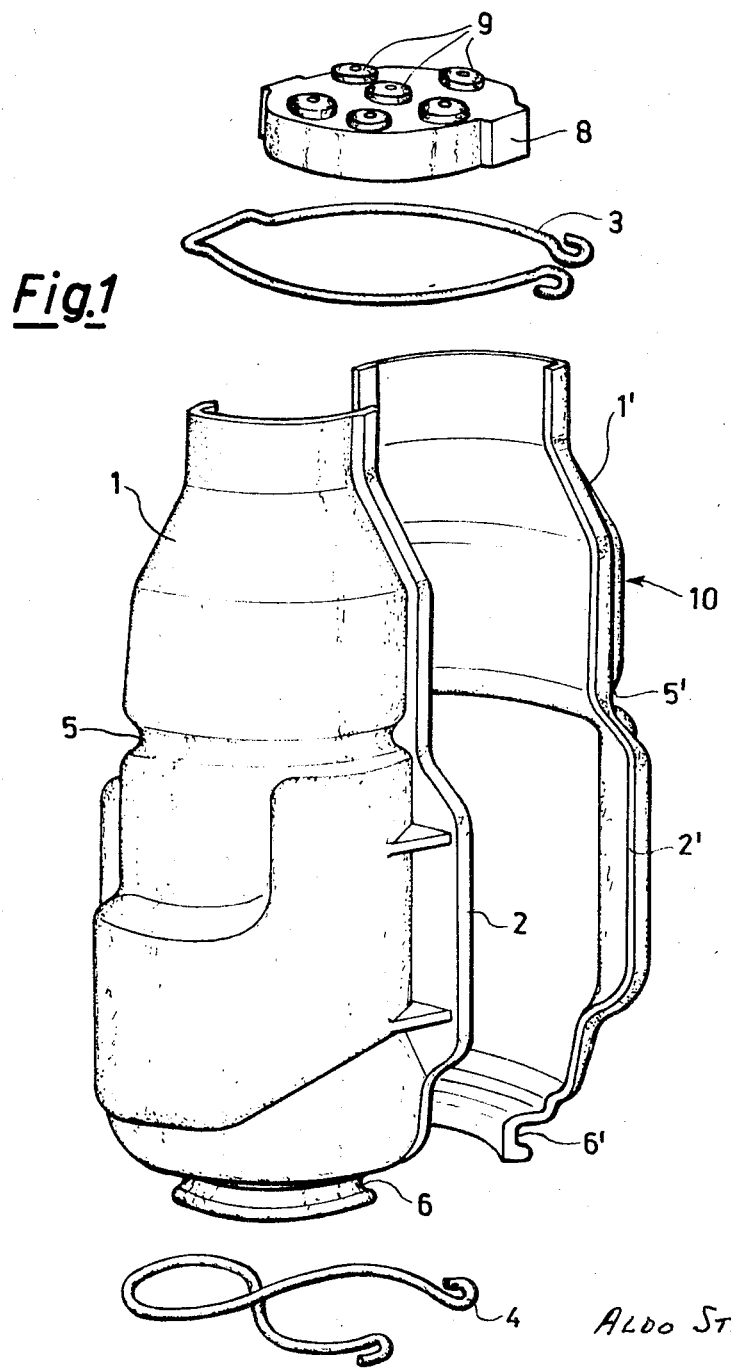

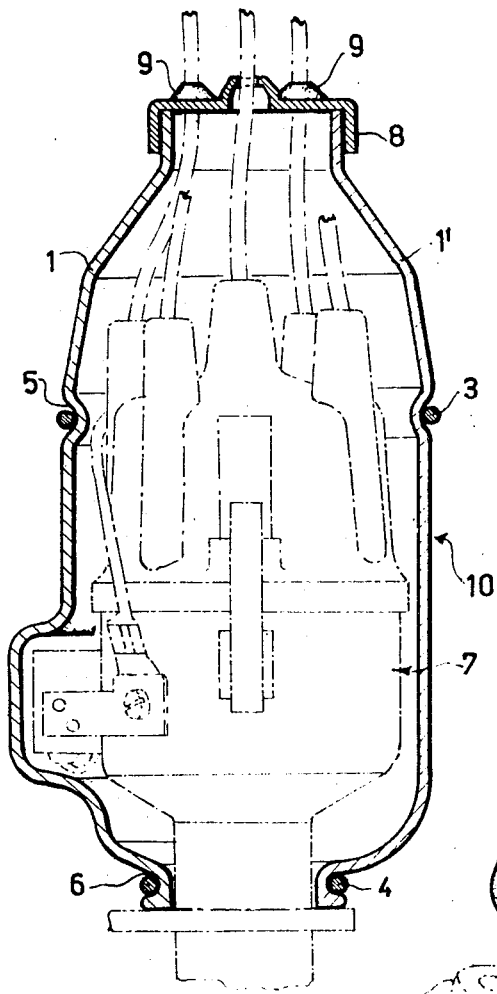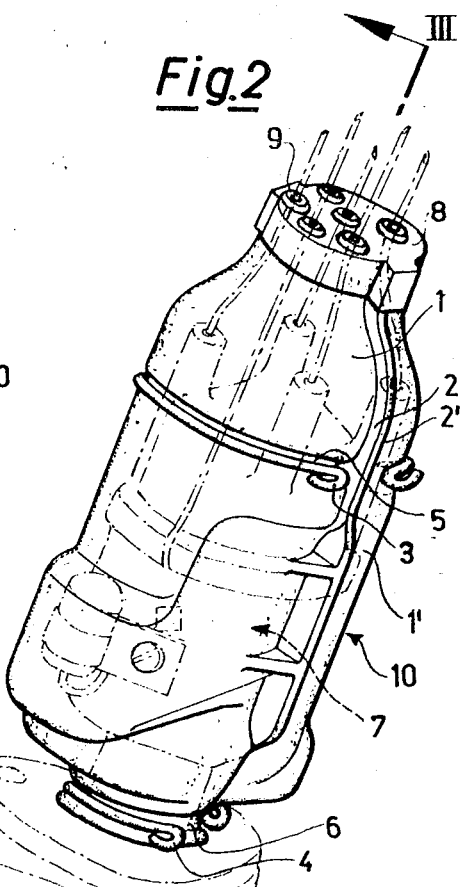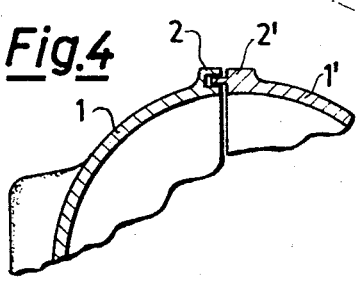

PROTECTIVE HOOD FOR IGNITION DISTRIBUTORS OF MOTOR VEHICLES

It is known that the ignition distributor of internal combustion engines for motor vehicles, since it is mechanically connected to the engine, is located beneath the hood which contains the engine and is thus exposed to the cooling air which should circulate around the engine. It is also known that it is virtually impossible to prevent said air from entraining dust, water drops, and other foreign matter. Considerable troubles are originated by such a situation as far as the operability of the distributor is concerned, so that the necessity of protecting the distributor with various means has been often pointed out. The difficulties in providing such a protection, however, are such that effective protection means, against whose use no contrary indications are present, have not been adopted as yet.

Among the difficulties cited above, the most significant ones are those inherent in the poor space available under the engine hood, particularly in the area where the distributor is located: another difficulty is originated by the necessity of a ready accessibility to the distributor by the mechanisms for the checking and maintenance operations. Also the costs inherent in a protection device are a considerable drawback in that they should be confined within the extremely narrow limited required for the construction of motor cars.

The object of the present invention is to provide a protective casing for the ignition distributor, having the following features:

1. A perfect tightness to liquids, dust, and other foreign matters.
2. A shape which matches in the closest possible manner the configuration of the ignition distributor so as to limit the bulk thereof.
3. An easy and rapid removability so as to give a ready access to the distributor whenever necessary.
4. Simplicity of construction.
5. A limited cost.

This invention achieves the object aforementioned by a protective casing formed by two stiff lateral shells which substantially match the shape of the distributor and which are adapted to be removably joined to one another in a sealtight manner around the distributor along lateral lips lying substantially on the plane passing through the axis of the distributor, by a resilient cap having sealtight passages for the electric connection cables, said cap being adapted to be removably slipped in a sealtight manner onto either end of the joined half-shells, and by at least two resilient clips which can be releasably applied around the two half-shells at the other end and at an intermediate portion of the half-shells.

It is apparent that a housing of this kind, in addition to securing a perfect tightness both to water and dust and other foreign matters, has a very limited bulk (the two half-shells closely grip the distributor), allows an easy access to the distributor (removability of the component parts), is simple in construction (more particularly can be made with simple molding operations) and has a low cost.

The housing according to the invention will be described in detail with reference to the accompanying drawings, wherein:

FIG. 1 is an exploded perspective view of the housing.
FIG. 2 is a perspective view of the housing as mounted on an ignition distributor, shown in phantom in its interior.
FIG. 3 is a longitudinal sectional view taken along the line III—III of FIG. 2, of the mounted housing, the distributor enclosed therein being shown in side elevational view,
FIG. 4 is a cross-sectional view showing the details of the junction of the two lateral half-shells.

The casing 10 shown in the drawings comprises to half-shells 1–1' of a stiff plastic material which match in their interior the outer shape of an ignition distributor, the half-shells having at their lateral edges protruding lips 2–2' coplanar with respect to one another and to the axis of the distributor, and adapted to match with a tenon and mortise connection, (FIG. 4).

Two resilient clips 3 and 4 can be housed in corresponding grooves 5–5' and 6–6' formed in the outer surface of the two half-shells and permit that the two half-shells be held in a sealtight manner one against another and around the distributor (see FIGS. 2 and 3, wherein the distributor is generally shown at 7).

While the lower end of the distributor is not sealed, the upper end is sealed since a cap 8 is provided, made of a resiliently yielding material (preferably an elastomer), and is adapted to be slipped in a sealtight manner onto the upper edges of the two half-shells so as to provide a closure and clamping means, the cap 8 having throughbores 9 to offer a sealtight passageway for the cables which connect the distributor to the coil and the spark plugs.

The final appearance of the assembly of the distributor and the protection casing is as shown in the perspective view of FIG. 2 and the sectional view of FIG. 3. With particular reference to FIG. 2, it can be seen that the casing 10 wraps rather tightly the distributor 7 as it matches the outline thereof both internally and externally. Thus, the bulk is limited and there is no necessity of employing special techniques for making the casing since the several component parts can be made by molding a suitable plastics material. The costs are thus confined with acceptable limits.

What I claim is:

1. A protective casing for ignition distributors of motor vehicles, characterized in that it is formed by two stiff lateral half-shells which are adapted substantially match the shape of the distributor and which are adapted to be removably joined to one another in a sealtight manner around the distributor along lateral lips lying substantially on the plane passing through the axis of the distributor, a resilient cap having sealtight passages for the electric connection cables, said cap being adapted to be removably slipped in a sealtight manner onto either end of the joined half-shells, and at least two resilient clips which can be releasably applied around the two half-shells at one end and at an intermediate portion of the half-shells.

2. A protective casing according to claim 1, characterized in that the two half-shells have external housing grooves for the two clips.

3. A protective casing according to claim 1 characterized in that the two half-shells are of a plastic material.

4. A protective casing according to claim 1, characterized in that the cap is made of an elastomeric material.